United States Patent [19]

Rocroi et al.

[11] 4,258,322
[45] Mar. 24, 1981

[54] ELECTROMAGNETIC SUBSOIL PROSPECTING PROCESS USING AN ASYMPTOTIC LOW FREQUENCY RANGE

[75] Inventors: Jean-Pierre Rocroi, Massy; André Cecchini, Chatenay-Malabry, both of France

[73] Assignee: Compagnie Generale de Geophysique, Massy, France

[21] Appl. No.: 903,800

[22] Filed: May 8, 1978

[30] Foreign Application Priority Data

May 9, 1977 [FR] France .............................. 77 14085

[51] Int. Cl.³ ............................................. G01V 3/10
[52] U.S. Cl. .................................... 324/335; 324/345
[58] Field of Search ................... 324/6, 334, 335, 345

[56] References Cited

U.S. PATENT DOCUMENTS

| | | | |
|---|---|---|---|
| 1,718,352 | 6/1929 | Guilford | 324/6 |
| 1,843,407 | 2/1932 | Sundberg | 324/335 |
| 2,731,596 | 1/1956 | Wait et al. | 324/6 |
| 3,548,299 | 12/1970 | Duroux et al. | 324/6 |
| 3,551,798 | 12/1970 | Enenshtein et al. | 324/6 |
| 3,936,728 | 2/1976 | Ghosh et al. | 324/6 |

OTHER PUBLICATIONS

Enenshtein, B. S., "*Interpretation Two-Layer Curves...for $P_2<P_1$*", Bull. Acad. of Sci., USSR; Geoph. Series; No.9, (Translation pp. 733–736).
Duprat et al., "Exemples... *L'Interpétation de Sondages Electriques*", Geophysical Prospecting, vol. 21, No. 3, Sep. 1973, pp. 543–559.
Kunetz et al., "*Traitement... of Electrical Soundings*", Geophysical Prospecting, vol. XVIII, No. 2, Jun. 1970, pp. 157–197.
Rocroi, J. P., "*Contribution... en Prospection Electrique*", Geophysical Prospecting, vol. 18, No. 4, 1975, pp. 765–778.

*Primary Examiner*—Gerard R. Strecker
*Attorney, Agent, or Firm*—Schwartz, Jeffery, Schwaab, Mack, Blumenthal & Koch

[57] ABSTRACT

In a sub-soil prospecting process a vertical magnetic field transmitter dipole and a receiver dipole are placed on the ground, away from each other. The receiver dipole is oriented to detect a radial horizontal magnetic field relative to the transmitter dipole. At low frequencies, the magnetic field detected assumes asymptotic values, and by measuring these values an apparent alternating current resistivity of the sub-soil is deduced. By varying the transmitter-receiver distance, and by simultaneously using a direct current electric prospecting process, a sub-soil model is determined which is less ambiguous than those supplied by electric or induction prospecting alone.

32 Claims, 3 Drawing Figures

FIG_1

ELECTROMAGNETIC SUBSOIL PROSPECTING PROCESS USING AN ASYMPTOTIC LOW FREQUENCY RANGE

BACKGROUND OF THE INVENTION

1. Field of the Invention

The invention relates to sub-soil prospecting using electro-magnetic techniques.

2. DESCRIPTION OF THE PRIOR ART

A first known sub-soil prospecting process, known as "electric prospecting or sounding" uses direct current. Two excitation electrodes are inserted into the earth at a distance D from each other, and a potential difference is applied between them causing a current to pass through the earth. Two detector electrodes spaced by a distance d are arranged between the two excitation electrodes. The potential difference between the detector electrodes is then measured. A series of such measurements is taken for different values of the distance D between the two exciter electrodes. With the values of the distance d and the applied voltage known it is possible to convert the voltages measured at the detector electrodes for various distances D, into values of apparent sub-soil resistivity associated with those values of D.

From a curve of apparent resistivities a sub-soil model can be deduced, defined by a sequence of resistivity values associated with depths of layers. Several processes for automatically processing resistivity curves obtained by the above method have already been proposed, particularly in the journal "Geophysical Prospecting", Vol. XVIII, No. 2, June 1970, page 157: "Automatic Processing of Electric Soundings", G. KUNETZ and J. P. ROCROI; Geophysical Prospecting, Vol. No. 21, No. 3, September 1973, p. 543, "Example of Application of Automatic Processing to the Interpretation of Electric Soundings", A. DUPRAT, F. GOLE and J. P. ROCROI.

A second known process of sub-soil prospecting (called the "induction sounding process") uses a transmitter dipole radiating an alternating electro-magnetic field, and a receiver dipole arranged to detect the resultant magnetic and/or electric field. By applying MAXWELL's equations, it is theoretically possible to deduce from the field detected by the receiver coil, and from the distance between the two coils, information on the resistivity of the various layers of the sub-soil. However, the solution of these equations is extremely complex. To solve them, it is necessary to use powerful numerical computing means and even then the computing time required is very substantial. As a result, except in very special cases, induction prospecting of the sub-soil has not hitherto been the subject of extensive industrial development.

Also known is a magneto-telluric detection process in which no artificially generated electric or magnetic fields is emitted towards the sub-soil. The process simply involves the detection by means of dipoles of the component of the electric field (along a horizontal direction) and the component of the magnetic field (along another horizontal direction, perpendicular to the foregoing) resulting from the currents naturally circulating in the sub-soil. Although useful information can be obtained by computer processing of the resultant measurements the process is by its very nature limited in usefulness because of the random existence of telluric currents.

Moreover, if only one of the foregoing sub-soil prospecting processes is used, for example the electric sounding process, even after processing of the measurements there remains some indetermination as regards the structure of the sub-soil. Indeed, various soil structures can give the same resistivity curve for the direct current measurements depending upon the distance set between the exciter electrodes, and such ambiguities are enhanced by the limited accuracy of measurements taken.

To enable a better determination of sub-soil structure, it has been proposed to combine measurements made using the electric sounding process and the magneto-telluric process, in such a manner as to obtain a more precise model of the sub-soil (Geophysical Prospecting, Vol. XXIII, No. 4, 1975, "Contribution to the Study of Equivalence in Electric Prospection (Direct and Magneto-Telluric Current)" J. P. ROCROI).

However, because of the very long computation times required for the processing of induction prospecting measurements, it has been hitherto economically impossible to combine electric and induction prospecting to improve the sub-soil model.

It is therefore an object of the present invention to provide a simplified process of induction sub-soil prospecting thereby enabling the combination of direct current measurements and alternating current induction measurements.

SUMMARY OF THE INVENTION

The present invention is based on the following observations made by the Applicants:

(1) When use is made of a vertical magnetic field transmitter dipole fed with an alternating current, and of a receiver dipole orientated to receive a substantially radial horizontal magnetic field, the radial horizontal magnetic field detected assumes asymptotic values when the frequency of the transmitted alternating current is decreased.

(2) These asymptotic values of the radial horizontal magnetic field are proportional to the angular velocity of the alternating current applied to the transmitter coil, that is, to the frequency of that current. The asymptotic values are also inversely proportional both to the apparent resistivity of the sub-soil to alternating current and to the distance between the transmitter and receiver dipoles.

(3) The apparent sub-soil resistivity to alternating current thus obtained can be expressed simply as a function of the individual resistivities and thicknesses of various layers of the sub-soil.

The induction sub-soil prospecting process of the present invention, thus comprises the steps of placing above the ground a magnetic transmitter dipole and a magnetic receiver dipole spaced from each other, energising the transmitter dipole with low frequency alternating current, and measuring the receiver dipole output to determine a low frequency asymptotic value of the magnetic field at the receiver dipole for the particular transmitter-receiver dipole distance used.

Preferably the transmitter dipole is vertical and the receiver dipole is orientated to detect the horizontal magnetic field. The detection axis of the receiver dipole is directed substantially towards the transmitter dipole in such a manner as to detect the magnetic radial horizontal field.

By varying the distance between the transmitter dipole and the receiver dipole and repeating said determination of a magnetic field low frequency asymptotic value for different transmitter-receiver dipole distances, an apparent resistivity curve can be obtained as a function of this distance. This curve together with known geological data can be used to construct a sub-soil model.

It is also advantageous to use a second receiver dipole orientated to detect the vertical magnetic field. Measurement of the vertical magnetic field makes it possible to determine whether an assumption that the sub-soil is of tabular structure is roughly permissible. Taken in combination with the radial horizontal magnetic field, it also enables variations of the maximum amplitude of the alternating current applied to the transmitter dipole to be ignored.

At the same time as the alternating current apparent resistivity measurements are made using the process of the invention, measurements can also be made of the direct current apparent resistivity using a standard electric prospecting technique. A comparison of these two apparent resistivities enables an improved model of the sub-soil to be obtained.

Thus a preferred process of the invention involves first of all constructing a model of the sub-soil from the apparent resistivity curve obtained using a direct current electric prospecting process. The ambiguities of this model are then reduced using the alternating current apparent resistivity curve.

It is, of course, possible to proceed the other way around, that is to prepare an initial sub-soil model from the alternating current resistivity curve and then eliminate certain ambiguities using the direct current resistivity curve.

BRIEF DESCRIPTION OF THE DRAWINGS

Sub-soil prospecting processes according to the invention will now be particularly described, by way of example, with reference to the accompanying diagrammatic drawings, in which.

DESCRIPTION OF THE PREFERRED EMBODIMENTS

Figure 1:
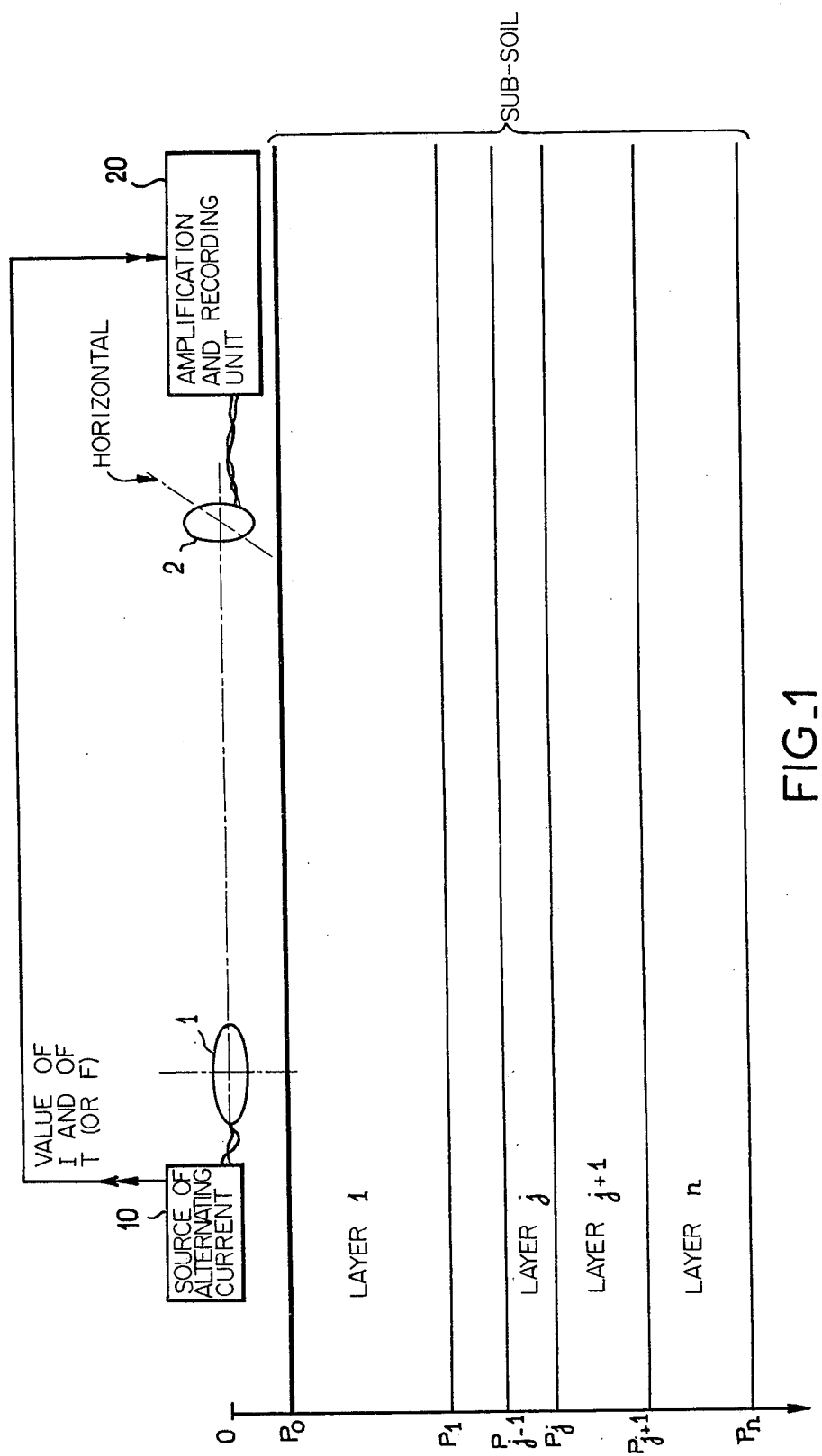
FIG. 1 is a cross-section of a layered sub-soil showing the arrangement above the ground surface of transmitter and receiver dipoles used in carrying out the prospecting process of the invention.

Shown in cross-section in FIG. 1 is a sub-soil composed of a number of layers numbered from 1 to n. A typical layer j extends between the depth $p_{j-1}$ and depth $p_j$. The ground surface is at depth $p_o$.

A transmitter dipole 1 and a receiver dipole 2 are assumed to be at a reference depth i.e. at depth zero. Preferably the level of the ground surface $p_o$ is very close to zero, that is, the dipoles 1 and 2 are placed practically at the level of the ground surface.

The transmitter dipole 1 is a vertical dipole transmitting a magnetic field and is constituted by a horizontal loop placed on the surface of the ground, or of a ferromagnetic core coil, whose axis is perpendicular to the ground. The transmitter dipole 1 is connected to a source of alternating current 10, which supplies to it a current of maximum amplitude I, and of period T. (It is well known of course that period T is the inverse of frequency, and that angular velocity $\omega$ is equal to $2\pi/T$). An efficiency coefficient e is defined for the dipole 1 such that the magnetic field that it transmits, expressed in ampere/meters is equal to the product e.I.

The receiver dipole 2 comprises a coil with an air or ferro-magnetic core. The coil is arranged in such a manner that its axis is horizontal and passes practically through the axis of the transmitter dipole 1. In practice, there may remain a small angle $\alpha$ between the axis of the receiver dipole 2 and the direction of the point of transmission relative to the position of the receiver dipole. The distance between the dipoles 1 and 2 is denoted by r. The sensitivity of the receiver dipole 2 to the magnetic field to which it is subjected is denoted by S.

The receiver dipole 2 is connected to an amplification unit 20 with display or recording facilities. This unit 20 receives the alternating voltage detected by the receiver dipole 2, and amplifies it by an amplification factor G, to produce an output voltage U which is displayed or recorded. Thus, the magnetic field at the receiver dipole is expressed by the following relationship:

$$|H_\alpha| = \frac{U}{G} \cdot \frac{1}{S} \quad (1)$$

In this equation, the first term represents the magnitude of the magnetic field $H_\alpha$ detected at the receiver dipole, the index $\alpha$ indicating that the field is not quite radial relative to the transmitter dipole 1 but is a field along a direction making a small angle $\alpha$ with the radial direction. The value $H_\alpha$ is placed between two vertical lines to indicate that the term represents maximum amplitude of the magnetic field taken as an absolute value.

Where the unit 20 has data recording facilities (for example recording on magnetic tape) not only is the value of the voltage U recorded but also the value of the maximum current I applied to the transmitter dipole 1 at the time of measurement, and the frequency or the period of this alternating current. The transmitter-receiver distance r is also recorded. When the unit 20 simply displays the value of the voltage U measured, a device for displaying of the maximum current I supplied from the source 10 is also provided. The operator also notes the frequency of the current fed to the transmitter dipole 1 and the transmitter-receiver distance r.

Figure 2:
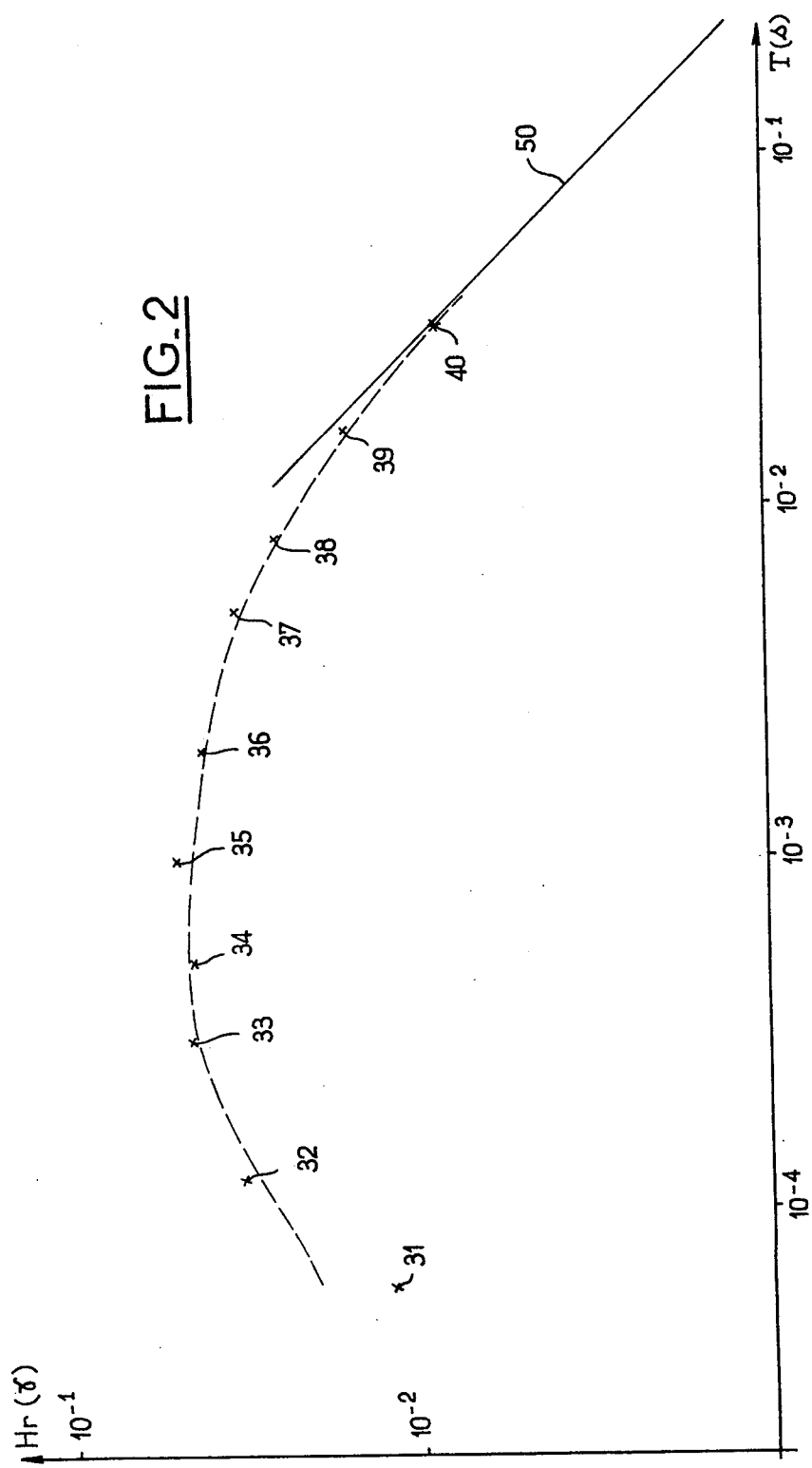
FIG. 2 is a graphic representation of the magnetic field as a function of the period of transmitter radiation in logarithmic co-ordinates, showing the asymptotic values of the magnetic field as a function of the period.

FIG. 2 illustrates a typical set of measurements made on site and clearly shows that the received magnetic field has an asymptotic value at low frequencies. In this Figure, the absolute value of the radial magnetic field is shown as an ordinate while the period T expressed in seconds is shown as abscissa. The co-ordinate scales are both logarithmic. The points 31 to 36 corresponding to on site measurements define a curve whose concavity faces downwards. Starting from point 37, the curve can be seen to tend towards a straight line as the period T increases. The curve thus tends towards an asymptote at low frequencies, that is the magnetic field takes on asymptotic values at low frequencies.

In the asymptotic region of the curve, the field is proportional to frequency, and thus inversely proportional to the period:

$$|H| = k/T \quad (2)$$

Taking into account that in FIG. 2 H and T are shown on logarithmic scales, we have:

$$\log |H| = \log k - \log T \qquad (3)$$

The graph of log |H| as a function of log T is therefore a straight line descending at 45° from the left to the right.

Starting from these observations the Applicants endeavoured to deduce simply from the asymptotic values of the magnetic field at the low frequencies a value of the apparent resistivity as a function of the distance r. Further, the Applicants also sought to determine relationships between the apparent resistivity thus obtained and the individual resistivities of the various layers of the sub-soil.

These steps necessitated theoretical calculations from MAXWELL equations as a starting point, calculations which are summarised in the Appendix 1 to the present description, while the formulae concerned are given in Appendix 2.

The final equation XI of Appendix 2 gives the ratio between the radial magnetic field Hr, the apparent resistivity ρ a and the distance r between the transmitter dipole and the receiver dipole, in units of the rationalised Giorgi system.

If the absolute value of the maximum field amplitude is taken, the imaginary number i (which indicates a 90° phase shift) disappears. The factor SI which indicates the field strength of the transmitter dipole, is now written e.I, account being taken of the definitions made above. Moreover, since in practice measurement is not made of the radial field, but of a field forming a small angle α with it, it is necessary to multiply the second term of equation XI by cos α. Finally the field Hα is expressed according to the practical unit known as gamma (or γ) well known to technicians. Equation XI thus now becomes:

$$\rho_a = 2 \cdot \pi^2 \cdot 10^{-5} \cdot e \cdot I \cdot \frac{1}{T} \cdot \frac{1}{r} \cdot \cos \alpha \cdot \frac{1}{H} \qquad (4)$$

wherein
ρa is the resistivity in ohms-meter;
e is the efficiency coefficient of the transmitter dipole (dimensionless);
I is the maximum amplitude of the current fed to the transmitter dipole in amperes;
T is the period of the current fed to the transmitter dipole in seconds;
r is the distance between the transmitter dipole and the receiver dipole is meters;
α is the angle between the field detection axis through the receiver dipole and the direction of the transmitter dipole; and
Hα is the field detected by the receiver dipole.

Moreover, inspection of equation X in Appendix 2 shows that there is a simple arithmetic relationship (not involving integrals) between the apparent resistivity ρ a of the sub-soil and the conductivities σj—or the resistivities ρj=1/σj of the various layers of the sub-soil.

These relationships being known, it becomes possible to use the apparent resistivity curve (dependent on the transmitter-receiver distance) obtained by alternating current induction prospecting.

The prospecting process of the invention relates to induction prospecting based on the foregoing relationships. A practical illustration of induction prospecting in accordance with the invention will now be given:

(a) A magnetic field is emitted from the dipole 1 at a frequency considered to be sufficiently low to meet the requirements of the low frequency approximation. The alternating current I applied to the transmitter dipole and the voltage U perceived by the receiver dipole are measured. The magnetic field is calculated at the level of the receiver dipole by means of equation (1) given above. The magnetic field is expressed in gammas. The value thus obtained is transferred to a system of logarithmic co-ordinates where the magnetic field |Hα| is expressed as a function of the period T (which is the inverse of frequency).

(b) A lower frequency is transmitted and the same operations are repeated.

(c) A third, still lower, frequency is emitted and the same operations are again repeated.

After that, it is easy to check from the measurements taken whether the low frequency approximation is good. If this is the case, the curve obtained approaches a straight line asymptote slanting at 45° downwards from left to right. It is the position of this straight line on the graph which gives the proportionality factor k connecting the magnetic field to the inverse of the period in equation (2) given above.

If the approximation is not verified, the measurements are repeated on at least two frequencies of still lower values, until satisfactory results are obtained.

To obtain immediately the apparent resistivity ρa, it is possible to modify slightly equation (4) to form the term composed of the product of the period T and the magnetic field |Hα|. Since this product is equal to k, equation (4) becomes:

$$\rho_a = 2 \cdot \pi^2 \cdot 10^{-5} \cdot e \cdot I \cdot \cos \alpha \cdot \frac{1}{r} \cdot \frac{1}{k} \qquad (5)$$

All the elements of this equation (5) are known, and it is therefore easy to derive the apparent resistivity ρa. This rapid derivation of the resistivity ρa can be seen to be due to the fact that the factor k can be found from two measurements taken in the field where the low frequency approximation is valid.

In a modified process according to the invention, the vertical magnetic field $H_z$ is also measured by a second receiver dipole placed at the same point as the first. If the sub-soil is of tabular structure, the apparent resistivity can be expressed as a function of the ratio of the vertical magnetic field $|H_z|$ to the radial magnetic field $|H_r|$ with the value of the current fed to the transmitter dipole being eliminated:

$$\rho_a = 2\pi^2 \, 10^{-7} \cdot \frac{r^2}{T} \cdot \left( \frac{|H_z|}{|H_r|} \right) \qquad (6)$$

It is therefore possible either to measure simultaneously $H_z$, $H_r$ and I and use both equations (5) and (6) to check the hypothesis that the sub-soil is tabular in structure, or, if the validity of this hypothesis can be reasonably assumed, then only $H_r$ and $H_z$ need be measured and their ratio used to determine the apparent resistivity ρa from the equation (6).

Whichever of the above processes is used, the operations involved are repeated for different values of the distance r between the point of transmission and the point of reception, to obtain a curve of the resistivity $\rho a$ as a function of said distance r, and this curve will hereinafter be referred to as the "alternating current resistivity curve".

Preferably, increasing values of the distance r are used because it has been observed that in this case the frequencies previously used continue to verify the conditions of the low frequency approximation.

Equations X and XI of Appendix 1 and 2 relate the alternating current apparent resistivity $\rho a$ and the resistivities $1/\sigma j$ of the various layers of the sub-soil, as well as their depths $p_j$ and the distance r. It is therefore possible to produce in usual manner a model of the sub-soil from only the alternating current apparent resistivity curve, that is from among the infinity of the sub-soil models likely to correspond to said curve, one is selected which is compatible with the known geological peculiarities of the area under study.

It has, however, been found preferable to combine with the induction prospecting process an electric prospecting process giving a direct current resistivity curve $\rho c$ as a function of the half-length of the base line (half the distance between the two exciter electrodes). The direct current resistivity curve $\rho c$ is processed in standard manner, and the alternating current resistivity curve $\rho a$ is used to reduce the indeterminate features of the model obtained from the direct current curve, this technique being called "reducing the limits of the equivalence" between the model proposed and the results of the electric and induction prospecting processes.

The basic steps of this technique are as follows:

(a) a likely model of the sub-soil is selected, defined by layer resistivities $\rho j$ and heights of layers $h_j$, with $h_j = p_j - p_{j-1}$;

(b) the corresponding theoretical curves are determined for the direct current resistivity $\rho c$ as a function of the base line half length, and for the alternating current resistivity $\rho a$ as a function of the distance r between transmitter dipole and receiver dipole;

(c) the initial model is improved by comparing the theoretical curves $\rho c$ and $\rho a$ with the corresponding curves obtained on site, and adjusting them according to the technique of successive approximations, using the method of least squares, described in the already-quoted works "Geophysical Prospecting" Vol. XVIII, No. 2, June 1970, pp. 170–175, as well as "Geophysical Prospecting" Vol. XXII, No. 4, 1975, pp 768–778.

Advantageously, at the start of step (c) the direct current ground resistivity curve $\rho c$ and/or of the alternating current resistivity curve $\rho a$, is modified in such a manner as to replace the curve by the closest curve corresponding to a tabular structure of the sub-soil ("Geophysical Prospecting", Vol. XVIII, No. 2, June 1970, pp. 187–188).

With this technique, it is obviously useful that the selection of the initial model should be made by a geophysicist on the examination of the curves $\rho c$ and $\rho a$ obtained. As an alternative, it is possible to determine by calculation the model of sub-soil corresponding, for example, to curve $\rho c$ ("inversion of the resistivity curve").

Moreover, it is advantageous that step (b) above should be followed by a determination of the limits of the equivalence between the results $\rho c$ of the electric prospecting process and the results $\rho a$ of the induction prospecting process. To do this, it is possible to make use of the technique described in "Geophysical Prospecting" Vol. XXIII, No. 4, 1975, pp. 766–770. This additional operation permits the compatibility of the curves $\rho c$ and $\rho a$ with each other to be estimated, for the initial model proposed.

The technique set out above enables refined sub-soil model to be obtained the reliability of which can be checked. Of course, if the reliability is found to be inadequate, the entire process may be restarted from a different initial model.

Figure 3:
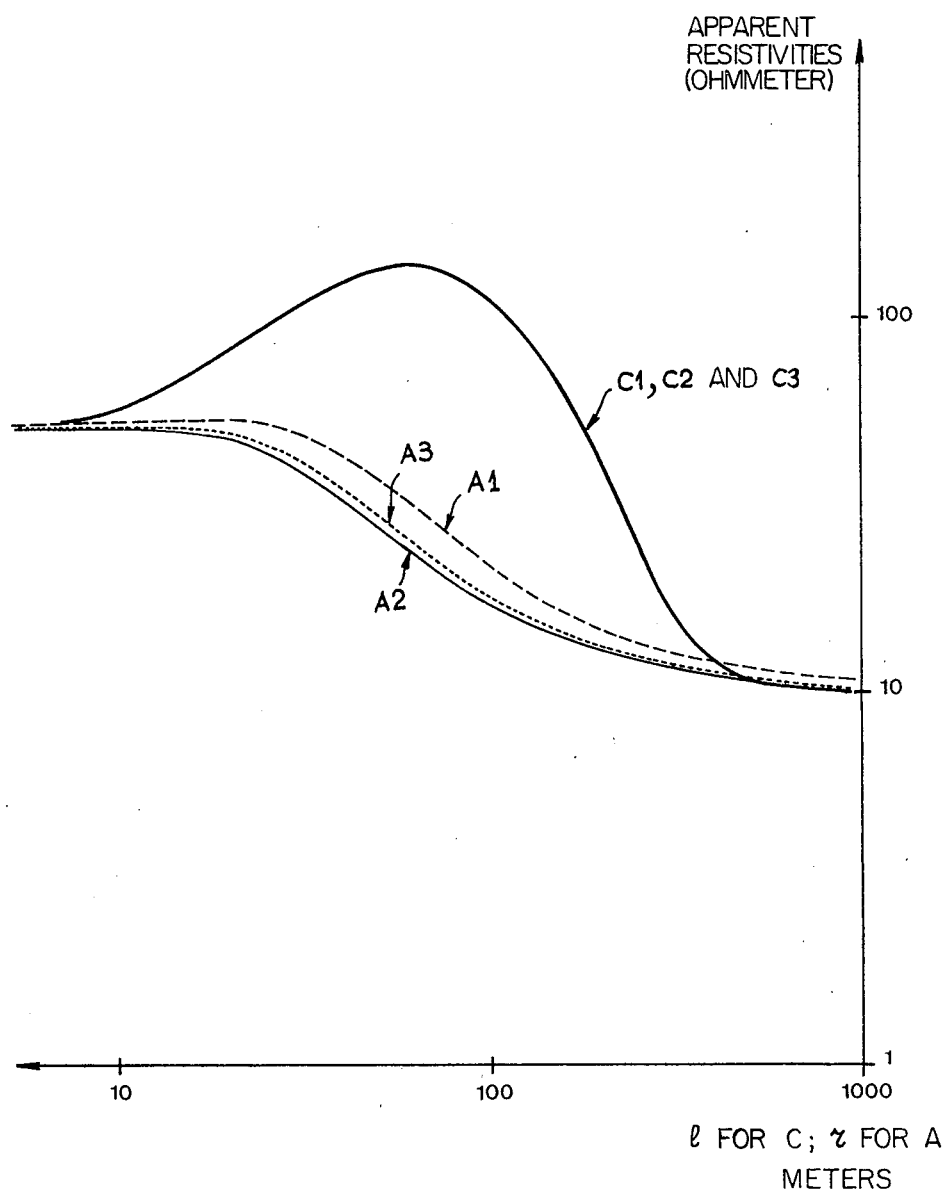
FIG. 3 is a graph showing a direct current resistivity curve and three alternating current resistivity curves.

An example will now be given with reference to FIG. 3 showing how induction prospecting can dispel ambiguities of an electric prospecting process.

The table below gives three examples of sub-soil structure:

| Sub-soil No. 1 | | Sub-soil No. 2 | | Sub-soil No. 3 | |
| --- | --- | --- | --- | --- | --- |
| $h_j$ | $\rho_j$ | $h_j$ | $\rho_j$ | $h_j$ | $\rho_j$ |
| 10 | 50 | 10 | 50 | 10 | 50 |
| 15 | 500 | 10 | 750 | 17 | 500 |
| 10 | 100 | 5 | 200 | ∞ | 10 |
| ∞ | 10 | ∞ | 10 | | |

In FIG. 3 these three different sub-soils give practically the same direct current resistivity curve (curve C). On the other hand, the alternating current curves A1, A2 and A3 are different. In such a case, the process described hereinabove will make it possible to obtain a much less ambiguous sub-soil model than the electric prospecting process alone would have done. This possibility of reducing ambiguity is one important consequence of the induction prospecting process of the invention.

Moreover, it has been observed that the standard direct current prospecting techniques are unable to clearly distinguish a number of contiguous and resistant underground layers found between a conductive surface layer and a conductive substratum. On the other hand, induction alternating current prospecting in accordance with the invention is able to distinguish these layers far better (see sub-soils Nos. 1, 2 and 3 of the above table and FIG. 3). Such a situation is a standard one in water-bearing soils; thus processes according to the invention are particularly useful in hydrogeology.

In the preferred method of the invention described above the magnetic transmitter dipole is vertical, the measured magnetic field is horizontal and substantially radial, and the transmitter and receiver dipoles are placed at ground level.

As already described it is clear that it is possible to detect the horizontal magnetic field in a non-radial direction, which brings in the angle $\alpha$ between the detection direction and the radial direction (a direction passing through the transmission and reception points)—see equation 5. Indeed, the tangential horizontal magnetic field is in principle nil and cannot disturb measurement. However, if the angle $\alpha$ assumes high values, the term "cos $\alpha$" in equation 5 decreases, and with it the sensitivity of measurement.

Where the transmitter and receiver dipoles are placed above ground, the magnetic field is described by equation IX which has one term more than equation X. However, the simple ratio (that is, without integrals) between the measured values of the field and the conductivities $\sigma j$ of the various layers, remains.

In Appendix 1 in fine, it will be noted that the low frequency approximation is also valid when the magnetic transmitter dipole is horizontal. Although the formulae involved are a little more complex, as the electric and magnetic fields derive from two scalar potentials, nevertheless, there still remains a simple ratio, without integrals, between the components of the magnetic field and the conductivities $\sigma j$ of the various layers.

As a result, it is also possible to carry out the prospecting process of the invention with a magnetic transmitter dipole of the horizontal type, and a vertical magnetic field receiver dipole, for example.

APPENDIX 1: EXPRESSION OF THE ASYMPTOTIC VALUES OF THE MAGNETIC FIELD PRODUCED BY A MAGNETIC DIPOLE IN THE PRESENCE OF A TABULAR SUB-SOIL

It is current practice to assume that the sub-soil is of a tabular structure, that is, bedded, and composed of n layers. In FIG. 1, layer j extends from the depth $z=p_{j-1}$ to the depth $z=p_j$; its electric conductivity is entered as $\sigma_j$. The surface of the soil is thus at level $z=p_o \geq 0$.

The magnetic transmitter dipole is in air, at level $z=0$. Through it passes an alternating current of maximum amplitude 1 and of angular velocity $\omega$. The surface of the dipole, denoted S, is equal to the elementary surface of a turn, multiplied by the number of turns.

It is necessary to solve the MAXWELL equations to determine the electric field and the magnetic field produced by the dipole. The work "Mining Geophysics", Vol. 2, 1967, published by the Society of Exploration Geophysicists, gives on page 50 a solution of the MAXWELL equations, with the usual approximations on the characteristics of the sub-soil; no electric charge or magnetic hysteresis in the sub-soil, negligible influence of the electric induction vector $\vec{D}$, proportionality of this same vector $\vec{D}$ to the electric field vector $\vec{E}$, and finally proportionality of the current density vector $\vec{\delta}$ to the electric field, i.e. $\vec{\delta} = \sigma \vec{E}$.

Under these conditions, the electric field vector $\vec{E}$ and the magnetic field vector $\vec{H}$ when expressed in cylindrical co-ordinates (r$\psi$z) can be written as linear combinations of two particular solutions. One of these two particular solutions corresponds to a magnetic field vector whose component along the z direction is nil. The other solution corresponds to an electric field whose component along the z direction is nil. With each of these two particular solutions it is possible to associate a respective scalar potential from which the electric field and the magnetic field are derived.

The Applicants first of all noticed that, for a vertical magnetic dipole, the vertical component (along the z axis) of the electric field is nil, which corresponds to the second particular solution. Under these conditions, the electric and magnetic fields henceforth depend only upon this second particular solution, and their components r, $\psi$ and z are expressed as a function of the scalar potential V associated according to the equations (I) (all the equations are given in Appendix 2).

The scalar potential V from which electric field vectors E and magnetic field vectors $\vec{H}$ are defined must for its part satisfy the conditions set forth in equation II, a and b.

In equations (I) and (II) $\mu$ defines the magnetic permeability of the medium concerned, and i denotes the imaginary unit well known in complex numbers. As the components of the vectors $\vec{E}$ and $\vec{H}$, as well as the scalar potential V, are expressed in the form of a sine function of time, their time derivative is obtained by multiplying them simply by $-i\omega$.

Bearing in mind the foregoing notations, equations (I) and (II) correspond to those given in the referenced work ("Mining Geophysicists"). Similar equations are also found, expressed in a more general system of co-ordinates, in the work entitled "Complements de Mathematiques" by Andre Angot, 5th ed. 1965, *Collection Technique et Scientifique du CNET,* p. 335; introduction of the specific conditions of the present application into these equations will result in equations identical to equations (I) and (II).

It is known that equation (IIa) can be integrated by using Bessel functions. The solution of equation (IIa) in air gives a primary potential $V_o$ expressed by equation III.

In this equation, function $J_o$ is a Bessel function of the first type and of order 0, $\lambda$ is an integration variable, and d is distance $\sqrt{r^2+z^2}$.

From this can be derived the expression for the primary fields transmitted directly through the air between the transmitter dipole and the receiver dipole. For example, the radial component of the primary magnetic field in the air is given by equation IV.

The word primary associated with the electric and magnetic fields and with the potential from which they derive, indicates that these are fields produced directly in the air by the transmitter dipole. Added to these are secondary field which are due to the presence of the sub-soil and which are still to be determined.

To determine these secondary fields, the tangential component of the electric field in each of the layers is first derived. For the layer j this field is given by equation V.

In this equation, $A_j$ corresponds to a wave propagating downwards and $B_j$ to a wave propagating upwards. Function $J_1$ is a Bessel function of the first type and of order 1.

The tangential component of the magnetic field is expressed by an equation of similar form.

The Applicants observed that it is not necessary to revert to the scalar potential $V_j$ in the various layers to express the continuity of the fields at the level of the surfaces of separation of the various layers. It is sufficient to consider the continuity of the tangential component of the electric field and that of the magnetic field. Recurrence relationships are then obtained between parameters $A_j$, $B_j$ and $R_j$ (see equations VI).

In air, $A_0=0$, and in the last layer, $B_{n+1}=0$. After having solved the recurrence relationships, it is possible to derive the expression for the secondary magnetic field which is produced in the air due to the various layers of the sub-soil. The component $H_r$ of this secondary magnetic field in the air is given by equation (VII).

The integral contained in this equation gives rise to fairly lengthy and intricate calculations.

It is at this stage that low frequency approximations can be usefully introduced to greatly simplify the recurrence relationship between the above-mentioned coefficients $A_j$ and $B_j$. With such approximations the Applicants noted that factor $B_o$ of equation (VI) can be expressed as a linear combination of the conductivities $\sigma_j$ of the various layers.

Thus, for the radial component $H_r$ of the secondary magnetic field the relationship given in equation VIII is obtained.

The total radial horizontal magnetic field at the level of the receiver dipole is given by the sum of the primary value (equation IV) and of the secondary value (equation VIII)—see equation (IX).

If we assume that the transmitter and receiver dipoles are at ground level, we have $P_o=0$ and $z=0$, which simplifies equation (IX) to the form shown in equation X.

Whereas equation (VII) contains an integral whose numerical evaluation is intricate, the equations (IX) and (X) enable an asymptotic value of the radial magnetic field to be obtained which is simply a summation of terms depending upon the conductivities and depths of the various layers.

If the expression between the square brackets in equation (X) is denoted by $1/\rho_a$, where $\rho_a$ corresponds to the apparent resistivity of the sub-soil at a point of radius r, equation (X) assumes the form given in equation XI.

It will now be clearly seen that the radial horizontal magnetic field assumes linear asymptotic values as a function of frequency, or of the angular velocity $\omega$ appearing in equation (XI). Moreover, these asymptotic values are inversely proportional to the apparent resistivity $\rho_a$ of the sub-soil, as well as to the distance r relative to the transmitter dipole.

The low frequency approximation also gives greatly simplified expressions for both the vertical magnetic field Hz, and the electric field.

The foregoing results have been derived for the case where the transmitter dipole is vertical. Where the transmitter dipole is horizontal, the expressions of the magnetic and electric fields in the air depend, not upon a single scalar potential as was the case previously, but upon two scalar potentials of the general case. Nevertheless, the use of low frequency approximations still give rise to greatly simplified expressions for the magnetic field at the level of the receiver dipole. Although these expressions are less simple than the equations (IX) to (XI), they also have the advantage that the fields are expressed as a summation of terms related to the conductivities of the various layers, instead of comprising the integral of a Bessel function. The numerical evaluation of these expressions is therefore also considerably facilitated.

APPENDIX 2: EQUATIONS (I) to (XI)

$$\vec{E} \Rightarrow \begin{cases} E_r = \dfrac{i\mu\omega}{r} \dfrac{\partial V}{\partial \phi} \\ E_\phi = -\dfrac{i\mu\omega}{r} \dfrac{\partial V}{\partial \phi} \\ E_z = 0 \end{cases} \vec{H} \Rightarrow \begin{cases} H_r = \dfrac{\partial^2 V}{\partial r \partial z} \\ H_\phi = \dfrac{1}{r}\dfrac{\partial^2 V}{\partial \phi \partial z} \\ H_z = \dfrac{\partial^2 V}{\partial z^2} + i\mu\tau\omega V \end{cases} \quad (I)$$

$$\begin{cases} a & \Delta V_j + i\mu\omega\sigma_j V_j = 0 \text{ in each layer } j \\ & \text{continuity of } V_j \text{ and } \dfrac{\partial V_j}{\partial z} \text{ at the surfaces of} \\ b & \text{separation of the various layers.} \end{cases} \quad (II)$$

$$V_o^* = \dfrac{SI}{4\pi} \int_o^\infty e^{-\lambda \cdot |z|} J_o(\lambda \cdot r)d\lambda = \dfrac{SI}{4\pi} \dfrac{1}{d} \quad (III)$$

$$H_{ro}^* = \dfrac{\partial^2 V_o^*}{\partial r \partial z} = \dfrac{SI}{4\pi} \dfrac{3rz}{d^5} \text{ (after integration)} \quad (IV)$$

$$\begin{cases} E_{\phi j} = \dfrac{SI}{4\pi} i\mu\omega \int_o^\infty (A_j e^{-R_j z} + B_j e^{+R_j z}) J_1(\lambda r) d\lambda \\ \text{ou } R_j = \sqrt{\lambda^2 - i\mu\sigma_j\omega} \end{cases} \quad (V)$$

$$\begin{cases} A_j e^{-R_j p_j} + B_j e^{R_j p_j} = A_{j+1} e^{-R_{j+1} p_j} + B_{j+1} e^{R_{j+1} p_j} \\ -R_j A_j e^{-R_j p_j} + R_j B_j e^{R_j p_j} = -R_{j+1} A_{j+1} e^{-R_{j+1} p_j} + R_{j+1} B_{j+1} e^{R_{j+1} p_j} \end{cases} \quad (VI)$$

$$H_r = -\dfrac{SI}{4\pi} \dfrac{\partial}{\partial z} \int_o^\infty B_o e^{\lambda z} J_1(\lambda r) d\lambda \quad (VII)$$

$$H_r = -\dfrac{SI}{4\pi} \dfrac{i\mu\omega}{4r} \left[ \sigma_{n+1} + \sum_{j=0}^{n} \dfrac{\sigma_j - \sigma_{j+1}}{\sqrt{1 + \left(\dfrac{r}{2p_j - z}\right)^2}} \right] \quad (VIII)$$

$$H_r = \dfrac{SI}{4\pi} \left( \dfrac{3rz}{d^5} - \dfrac{i\mu\omega}{4r} \left[ \sigma_{n+1} + \sum_{j=0}^{n} \dfrac{\sigma_j - \sigma_{j+1}}{\sqrt{1 + \left(\dfrac{r}{2p_j - z}\right)^2}} \right] \right) \quad (IX)$$

$$H_r = -\dfrac{SI}{4\pi} \dfrac{i\mu\omega}{4r} \left[ \sigma_{n+1} + \sum_{j=1}^{n} \dfrac{\sigma_j - \sigma_{j+1}}{\sqrt{1 + \left(\dfrac{r}{2p_j}\right)^2}} \right] \quad (X)$$

$$H_r = -\dfrac{SI}{4\pi} \dfrac{i\mu\omega}{4} \cdot \dfrac{1}{r} \cdot \dfrac{1}{\rho_a} \quad (XI)$$

We claim:

1. A sub-soil prospecting method, comprising the steps of:
   (a) placing above ground a magnetic transmitter dipole and a magnetic receiver dipole spaced at a distance from each other in a prospecting area;
   (b) energizing the transmitter dipole with alternating current of frequency below a predetermined low frequency;
   (c) sensing at an output of the receiver dipole a signal representing a detected magnetic field, said predetermined low frequency being a maximum frequency of an asymptotic range in which the magnetic field represented by the receiver dipole output signal is linearly related to the energizing frequency; and
   determining a quantity related to the ratio of the magnitude of said sensed signal to the value of said energizing frequency.

2. A sub-soil prospecting method according to claim 1, further including the steps of varying the distance between the transmitter dipole and the receiver dipole, and repeating steps (b) and (c).

3. A subsoil prospecting method according to claim 1 or claim 2, wherein said predetermined low frequency is no greater than about 100 Hz.

4. A subsoil prospecting method according to claim 1 or claim 2, wherein said step of energizing the transmitter dipole includes the step of varying the frequency of said alternating current, and wherein the step of sensing a signal at the receiver dipole output includes sensing a signal for each transmitter dipole energizing frequency.

5. A subsoil prospecting method according to claim 4, wherein the frequency of the alternating current is varied by stepwise reduction of the frequency.

6. A subsoil prospecting method according to claim 5, wherein the frequency reduction is conducted in successive frequency steps related by a geometrical progression to give equal steps on a logarithmic scale.

7. A subsoil prospecting method according to claim 1 or claim 2, wherein step (a) includes the steps of orientating the transmitter dipole as a vertical magnetic dipole, and orientating the receiving dipole with its axis directed towards the transmitter dipole to detect a substantially radial horizontal magnetic field with respect to the transmitter dipole.

8. A sub-soil prospecting method according to claim 7, further comprising the steps of placing a second receiver dipole at substantially the same location as said first-mentioned receiver dipole, and orientating the second receiver dipole to detect a substantially vertical magnetic field, whereby the asymptotic values of the relation between the detected vertical magnetic field and the detected horizontal magnetic field may be determined as a function of the distance between the transmitter dipole and the receiver dipoles.

9. A sub-soil prospecting method according to claim 1 or claim 2, wherein the magnetic transmitter and receiver dipoles are placed substantially at ground level.

10. A subsoil prospecting method according to claim 2, wherein the distance between the transmitter and receiver dipoles is progressively increased.

11. A sub-soil prospecting method according to claim 2, wherein the distance between the transmitter and receiver dipoles is varied in geometrical progression for each repetition of steps (b) and (c) to give equal steps on a logarithmic scale.

12. A sub-soil prospecting method according to claim 2, further comprising the steps of constructing from the signals representing detected magnetic fields an alternating-current apparent resistivity curve as a function of the distance between the transmitter and receiver dipoles.

13. A sub-soil prospecting method according to claim 12, further comprising the step of carrying out at the same prospecting area a direct-current electric prospecting method comprising the steps of:
  placing in the ground two exciter electrodes at a distance from each other;
  placing two closely spaced detector electrodes in the ground between the exciter electrodes;
  applying a direct-current potential across the exciter electrodes;
  measuring the resultant potential between the detector electrodes;
  repeating said potential measurement for different distances between the exciter electrodes; and
  constructing a direct-current apparent sub-soil resistivity curve as a function of the distance between the exciter electrodes.

14. A sub-soil prospecting method according to claim 13, further comprising the step of combining the measurements taken using said direct-current prospecting method with the receiver dipole output signals of the alternating-current prospecting method to construct a relatively less ambiguous model of the sub-soil.

15. A sub-soil prospecting method according to claim 14, wherein said step of combining includes the steps of:
  determining an initial model of the subsoil;
  determining theoretical direct-current and alternating-current apparent resistivity curves corresponding to the initial model;
  adjusting the theoretical curves to the constructed curves using the least squares successive approximations techniques; and
  adjusting the initial model to agree with the adjusted theoretical curves.

16. A sub-soil prospecting method, comprising the steps of:
  (a) placing a magnetic transmitter dipole and a magnetic receiver dipole at respective locations above ground spaced at a distance from each other in a prospecting area;
  (b) energizing the magnetic transmitter dipole with a low frequency alternating current;
  (c) sensing at an output of the magnetic receiver dipole a signal representing a detected magnetic field; and
  (d) repeating steps (b) and (c) while varying the frequency of said alternating current until reaching a low-frequency asymptotic range in which the detected magnetic field represented by the receiver dipole output signal is substantially linearly related to the alternating current energizing frequency; and
  for each repetition of steps (b) and (c), determining a quantity related to the ratio of the magnitude of said sensed signal to the value of said energizing frequency.

17. A sub-soil prospecting method according to claim 16, wherein step (d) comprises repeating steps (b) and (c) for successively decreasing low frequencies until the output signal of the receiver dipole lies within said asymptotic range.

18. A sub-soil prospecting method according to claim 17, wherein the frequency of said alternating current is successively reduced in steps.

19. A sub-soil prospecting method according to claim 18, wherein the successive steps of frequency reduction are related by geometrical progression to give equal steps on a logarithmic scale.

20. A sub-soil prospecting method according to claim 16, wherein step (a) includes the steps of orientating the transmitter dipole as a vertical magnetic dipole and orientating the receiver dipole with its axis directed substantially toward the transmitter dipole to detect a substantially radial horizontal magnetic field with respect to the transmitter dipole.

21. A sub-soil prospecting method according to claim 20, wherein both said transmitter and receiver dipoles are placed substantially at ground level.

22. A sub-soil prospecting method according to claim 21, further comprising the step of determining the ratio of the value of the detected radial horizontal magnetic field represented by the receiver dipole output signal to the value of the energizing alternating current frequency, said radio being substantially constant when the energizing alternating frequency is within said low-frequency asymptotic range.

23. A sub-soil prospecting method according to claim 20, further comprising placing a second receiver dipole at substantially the same location as said first-mentioned receiver dipole, orientating the second receiver dipole to detect a substantially vertical magnetic field, sensing at an output of the second magnetic receiver dipole a signal representing the detected vertical magnetic field, and determining a quantity related to the ratio of the value of the detected horizontal radial magnetic field to the value of the detected vertical magnetic field.

24. A sub-soil prospecting method according to claim 16, wherein step (d) further comprises repeating steps (b) and (c) while varying the distance between the transmitter and receiver dipoles whereby at least one receiver dipole output signal representing a detected magnetic field value lying within the low-frequency asymptotic range is obtained for each transmitter dipole to receiver dipole distance.

25. A sub-soil prospecting method according to claim 24, wherein the distance between the transmitter and receiver dipoles is successively increased, step (d) comprises repeating steps (b) and (c) once for each transmitter dipole to receiver dipole distance, and the frequency of the energizing alternating current is within the low-frequency asymptotic range for the initial transmitter dipole to receiver dipole distance.

26. A sub-soil prospecting method according to claim 25, wherein the distance between the transmitter dipole and the receiver dipole is successively increased in steps, the increasing distances forming a geometrical progression to give equal steps on a logarithmic scale.

27. A sub-soil prospecting method according to claim 24, further comprising the step of recording a receiver dipole output signal value representing a detected magnetic field lying within the asymptotic range as a function of the transmitter dipole to receiver dipole distance.

28. A sub-soil prospecting method according to claim 27, further comprising the step of determining an alternating current apparent resistivity value from each said at least one magnetic receiver dipole output signal, the alternating current apparent resistivity being a function of transmitter dipole to receiver dipole distance and being substantially independent of the alternating current energizing frequency.

29. A sub-soil prospecting method according to claim 28, wherein the magnetic transmitter dipole is placed having a dipole axis thereof arranged vertically, the magnetic receiver dipole is placed having a dipole axis thereof arranged horizontally and directed substantially radially towards the transmitter dipole, and the alternating current apparent resistivity values are determined in accordance with the relationship:

$$\rho_a = 2 \cdot \pi^2 \cdot 10^{-5} \cdot e \cdot I \cdot \frac{1}{T} \cdot \frac{1}{r} \cos \alpha \cdot \frac{1}{H_\alpha}$$

wherein
- $\rho_a$ is the alternating current apparent resistivity in ohms-meter;
- e is the efficiency coefficient of the transmitter dipole (dimensionless);
- I is the maximum amplitude of the current fed to the transmitter dipole in amperes;
- T is the period of the alternating current fed to the transmitter dipole in seconds;
- r is the distance between the transmitter dipole and the receiver dipole in meters;
- $\alpha$ is the angle between the field detection axis through the receiver dipole and the direction of the transmitter dipole; and
- $H_\alpha$ is the magnetic field detected by the receiver dipole.

30. A sub-soil prospecting method according to claim 28, further comprising the step of carrying out at the same prospecting area a direct-current electric prospecting method comprising the steps of:
  placing in the ground two exciter electrodes at a distance from each other;
  placing two closely spaced detector electrodes in the ground between the exciter electrodes;
  applying a direct-current potential across the exciter electrodes;
  measuring the resultant potential between the detector electrodes;
  repeating said potential measurement for different distances between the exciter electrodes; and
  constructing a direct-current apparent sub-soil resistivity curve as a function of the distance between the exciter electrodes.

31. A sub-soil prospecting method according to claim 30, further comprising the step of combining the measurements taken using said direct-current prospecting method with the receiver dipole output signals of the alternating current prospecting method to construct a relatively less ambiguous model of the sub-soil.

32. A sub-soil prospecting method according to claim 31, wherein said step of combining includes the steps of:
  determining an initial model of the subsoil;
  determining theoretical direct-current and alternating-current apparent resistivity curves corresponding to the initial model;
  adjusting the theoretical curves to the constructed curves using the least squares successive approximations technique; and
  adjusting the initial model to agree with the adjusted theoretical curves.

* * * * *